Sept 10, 1957     W. G. EDWARDS     2,806,207
AUTOMATIC INDICATING INSTRUMENT
Filed Sept. 29, 1953
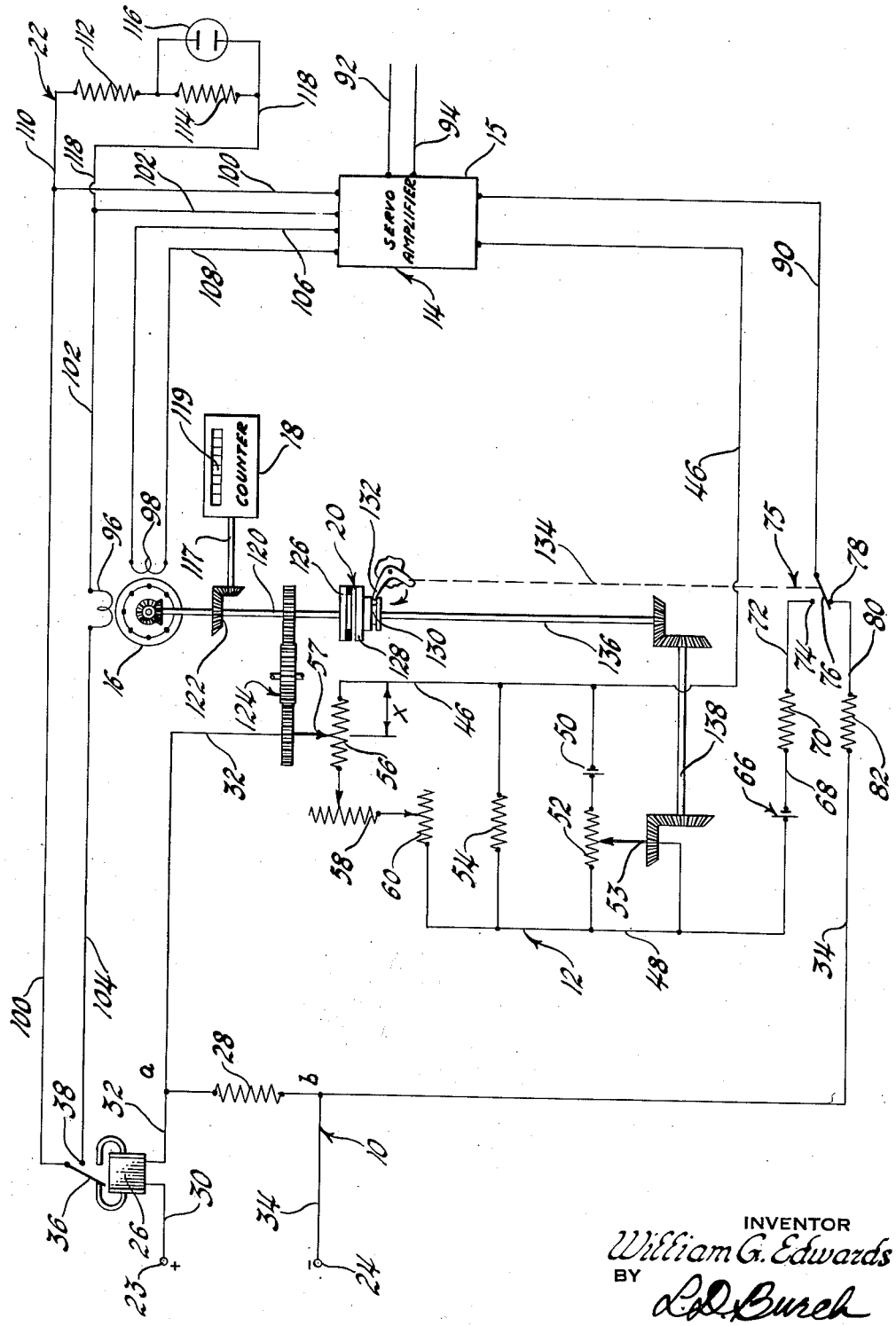
INVENTOR
*William G. Edwards*
BY
*L. D. Burch*

United States Patent Office 2,806,207
Patented Sept. 10, 1957

2,806,207

AUTOMATIC INDICATING INSTRUMENT

William G. Edwards, Milwaukee, Wis., assignor to General Motors Corporation, Detroit, Mich., a corporation of Delaware Application September 29, 1953, Serial No. 383,061

4 Claims. (Cl. 324—99)

This invention relates to electrical measuring instruments, and more particularly, to instruments of the continuously and automatically balanced potentiometric variety for measuring small values of current or voltage.

The invention may be used wherever it is desired to measure small currents or voltages with a very high degree of accuracy and is specially suited for production testing involving the checking and standardization of precision electrical components. Apparatus heretofore available possessed of the accuracy required for these purposes has been of the precision laboratory variety requiring skilled technical personnel for the successful operation thereof. These instruments generally are complex in structure and usually employ for the indicating portion thereof a sensitive moving-coil galvanometer arrangement with a mirrored scale and hair-line pointer which requires for accurate reading thereof that the field of vision of the reader or operator be centered and maintained in a plane passing through the pointer and the reflection of the pointer on the mirrored scale. By reason of their delicate construction and complex operation, such devices are unsuited for continuous production testing purposes and do not readily admit of operation by unskilled personnel. The manner in which such instruments must be read requires interpolation of readings, which may produce controversial results where close tolerances are required, and induces eye strain resulting in operator fatigue and decrease in efficiency.

Accordingly, the present invention has among its objectives to provide electrical measuring apparatus for shop or production testing which affords the accuracy of precision laboratory instruments and yet may be operated by unskilled personnel without inducing operator fatigue. Other objects of the invention are to provide such electrical measuring apparatus which is characterized by relatively simple and rugged design and which does not require interpolation of readings.

The invention employs a form of potentiometric bridge arrangement for comparing a current or voltage to be measured against a standardized or calibrated potential source furnishing a comparison voltage of known magnitude and of opposite polarity to the unknown signal. The error or difference voltage between the unknown and comparison voltage is applied to the control winding of a servomotor forming a part of a closed-loop servo follow-up system to adjust the potentiometer for null balance of the bridge or circuit. In accordance with the invention the servomotor drives a mechanical counter or totalizer on which the actual measured value of current or voltage is displayed or recorded in the form of positive numerical indicia to an accuracy of 2 decimal places in such manner as not to require interpolation of reading nor to induce operator fatigue. Unique provision is made for automatically standardizing the comparison source against a reference standard cell contained in the instrument through the expedient of a cooperating clutch assembly, thereby assuring continued accuracy and reliability of results.

The above and other objects, advantages and features of the present invention will appear more fully from the following detailed description and schematic drawing.

Referring to the drawing 10 is the input circuit of the measuring apparatus; 12 a potentiometer circuit arrangement which forms with the input circuit a null comparison balancing circuit; 14 a servo follow-up system which includes a servo amplifier 15 and a servomotor 16; 18 a mechanical counter which displays the magnitude of the unknown signal measured with the apparatus; 20 a clutch assembly which is used during calibration or standardization of the comparison circuit; and 22 a warning light circuit to indicate when readings can be made with the apparatus.

The input circuit 10 includes a pair of input terminals 23, 24 between which are connected the series combination of a polarized relay 26 and an input or measuring resistance 28 over the conductors 30, 32 and 34, as shown. The relay 26 is a conventional S. P. D. T. polarized relay with a movable switch arm 36 and an energizable contact 38 which are connected in series with one of the windings of the servomotor 16, as will be explained hereinafter. Resistor 28 develops a potential difference between the terminals $a$, $b$ thereof proportional to the amplitude of the signal current impressed upon the input terminals 23, 24.

The potentiometer circuit 12 comprises an arrangement of parallel branch circuits connected between the branch conductors 46, 48 and are successively constituted by a series arrangement of a battery source or cell 50—furnishing comparison signal potentials of known or determinable amplitude—and a battery adjust potentiometer 52 having a variable or adjustable arm 53; a parallel load stabilizing resistor 54; and an arrangement of serially connected potentiometers including a main or balancing potentiometer 56 having a variable or adjustable arm 57 and a coarse adjust potentiometer 58 and a fine adjust potentiometer 60, connected as shown. Potentiometer 56 may be of the helical multi-turn variety such as is manufactured by the Heli-Pot Corporation. Potentiometers 58 and 60 are employed to aid in the setting and initial adjustment of the main balancing potentiometer 56. The size of the various potentiometers and resistances employed in the apparatus will be determined by the range of signal currents or voltages to be measured therewith.

The battery or comparison source 50 may be a conventional type-A 1½ volt dry cell the negative terminal of which is connected to the conductor 46 and its positive terminal to one side of the battery adjust potentiometer 52. The variable arm 53 of the latter is connected to conductors 48 and to the positive side or terminal of a standard reference source or cell 66 the negative side of which is connected over conductor 68 to one side of resistor 70. The latter is connected over conductor 72 to one contact 74 of a S. P. D. T. selector switch designated generally at 75 and having a switch arm 76 associated therewith operable between the contacts 74 and 78 thereof. Contact 78 of switch 75 is connected over conductor 80, resistor 82 and conductor 34 to the negative or low potential terminal $b$ of resistor 28 in the input circuit of the measuring apparatus. (Resistors 70 and 82 are antihunt resistors which are used to stabilize the servo system and their size will depend largely on the characteristics of the servo apparatus.) The positive or high potential terminal $a$ of the resistor 28 is connected over conductor 32 to the variable arm 57 of the balancing potentiometer 56. Switch arm 76 of the selector switch 75 is connected over conductor 90, which—with the extension of conductor 46 from the potentiometer circuit—supplies an energizing input signal to the amplifier 15 of the servo follow-up system.

The servo amplifier 15 may be of the type known in the art such as is manufactured by the Brown Instruments Division of the Minneapolis Honeywell Regulator Co. Such apparatus may include a synchronous vibrating reed-type converter and associated transformer for converting D. C. input signals to an essentially line frequency A. C. signal, a voltage amplifier and a normally balanced power amplifier, all of which may be contained within the unit 15. Conductors 92, 94 shown connected to the amplifier are adapted to be connected to a 115 volt, 60 cycle local power source for furnishing 60 cycle power to the synchronous converter, the voltage and power amplifiers and the servomotor 16.

The servomotor 16 may be a two phase induction motor of the type commonly employed in servo systems with a pair of windings 96, 98 associated therewith. The signal output of the servo amplifier appears across the conductors 100, 102 thereof, conductor 100 being connected to arm 36 of relay 26, contact 38 of which is connected by conductor 104 to the control winding 96 of the motor and then back to the amplifier by conductor 102, as shown. The other or reference phase winding 98 of the servomotor 16 is connected over conductors 106, 108 back to the amplifier 15 so as to be energized in synchronism with or in correct phase relation with the energization of the servo amplifier from the local power source, as customarily done with such servo amplifiers.

The warning light circuit 22 is constituted by conductor 110 connected from conductor 100 to a fixed voltage divider composed of resistances 112 and 114 with a neon light 116 connected across resistor 114 and a conductor 118 connected between conductor 102 and the lower side of resistor 114 and light 116. This circuit functions to indicate when the servo motor 16 is energized and is operating during which time readings are not to be taken from the counter 18. The counter may be of the direct drive non-reset type as manufactured by the Veeder-Root Co., and includes a number of counting wheels 119 therein which display the measured value of the test signal in the form of positive numerical indicia, much the same as the odometer on an automotive vehicle. The counter shaft 117 is geared to the motor shaft 120 through an arrangement of step-up gearing 122, such, for example, that ten revolutions of the motor shaft result in 1,000 revolutions of the counter shaft.

The motor shaft 120 is coupled through a train of gears 124 to drive the variable arm 57 of the balancing potentiometer 56 for automatically changing the output of the potentiometer circuit for balancing thereof, as will later appear. The clutch assembly 20 shown in diagrammatic form is associated with the motor shaft and may comprise a pair of clutch disks 126 and 128 the latter of which has a grooved rear portion 130 that receives one end of a manually operable bell-crank lever 132 for shiftably engaging and disengaging the clutch disks. The lever 132, which may partake of other mechanical forms, is shown for purpose of illustration coupled to the movable switch arm 76 of the selector switch 75 through a suitable operating linkage or connection 134, although other means of inter-associating these two elements may be employed. A driven shaft 136 fastened to the clutch disk 128 is shown coupled over a suitable shaft and associated gearing arrangement collectively designated as 138 to drive the variable arm 53 of the battery adjust potentiometer 52 during the standardization operation which precedes the use of or conditions the apparatus for measuring purposes.

The standardization operation is accomplished by manual operation of the lever 132 to cause engagement of the clutch with the motor shaft and to change the position of the selector switch 75 from contact 78 for test position to contact 74 thereof for standardizing position. The latter causes the standard cell 66 to be connected in circuit with the potentiometer circuit 12.

With the standard cell connected in circuit, current will flow in a circuit from the positive terminal of the cell 66, conductor 48, potentiometer arm 53 and potentiometer 52, the comparison or battery source 50, conductor 46 to the input of the amplifier 15 and back over conductor 90, selector switch arm 76, contact 74, conductor 72, resistor 70, and conductor 68 to the negative terminal of the standard cell 66.

It will be noted that current from the battery source 50 flows through exactly the same circuit traced above, only in the opposite direction thereto. The difference signal or current due to the standardizing cell 66 and battery source thus will be impressed upon the input terminals of the servo-amplifier 15. Depending upon the magnitude and relative polarity or direction of the resulting flow of difference current, the servo motor will be energized and caused to rotate an amount and in such direction as to adjust the position of the battery adjust potentiometer arm 53 through the clutch assembly and shafts and gearing associated therewith to reduce the difference current to zero, when the effect of the battery source 50 will be the same as that of the known reference standard source and the system will be at null or balanced. The servo motor 16 will have stopped its motion under these conditions, no input signal being applied to the servo amplifier to control the energization of the servo motor. The lever or bell crank 132 may then be operated to disengage the battery adjust potentiometer 52 from the servo motor drive through the clutch assembly and to restore the switch arm 76 of the selector switch to contact 78.

The apparatus is now standardized and conditioned for measuring of signals of unknown amplitude. The unknown signal is then applied across the terminals 23, 24 of the input circuit to develop a potential drop over the measuring resistor 28 by the unknown signal current flow thereto. Polarized relay 26 will not close its contacts 36, 38 to permit operation of the servo motor unless the current flow through resistor 28 is in the correct direction, that is, from terminal $a$ to $b$ so that terminal $a$ will be of positive or higher potential in relation to terminal $b$. Current due to the signal potential developed across resistor 28 will then flow in a circuit traced from conductor 32, potentiometer arm 57 of potentiometer 56 and through the portion labelled $x$ of the latter, then over conductor 46 to the input of amplifier 15 and back over conductor 90, switch arm 76 and contact 78 of selector switch 75, conductor 80, resistor 82, and conductor 34 to the low potential terminal or side $b$ of the resistor 28.

It will be noted that a portion of the voltage of the battery or comparison source 50 also appears across the portion $x$ from conductor 46 to variable arm 57 of potentiometer 56 and that this voltage also is effective to cause a current flow in the opposite direction to that of said unknown signal in the circuit traced above. Thus, only the difference or error between the unknown signal and known comparison signal will be applied to the input of the servo amplifier to cause operation of the servo motor in such direction as to change the setting of the balancing potentiometer 56 to reduce the difference or error signal to zero. The voltage drops across potentiometer portion $x$ due to the two flow sources involved then will be matched and the circuit brought to null balance. The counter 18 being driven by the motor will record a certain set of figures thereon in the form of positive numerical indicia which figures will be related to the amplitude of the measured signal. The apparatus may be calibrated by insertion of a signal current of known amplitude so as to set or correlate the indication of the counter wheels with the actual signal magnitude.

The warning light circuit 22 will be lit and energized when the servo motor 18 is rotating during energization thereof in response to a resulting error signal impressed upon the servo amplifier. At balance, the light 116 will be extinguished to signify to the operator that the counter can then be read.

What is claimed is:

1. Electrical measuring apparatus for measuring the magnitude of an unknown current comprising the combination of an input circuit including a pair of input terminals for receiving said unknown current, a polarized relay having a pair of normally open contacts and an operating coil therefor one side of which coil is connected to one of said input terminals, and a measuring resistor connected to the other side of said operating coil and to the other input terminal of said input circuit, a potentiometer measuring circuit including an adjustable resistor and a battery, a servo amplifier having a pair of input terminals and a pair of output terminals the input terminals of which are connected in a series circuit that includes said potentiometer measuring circuit and said measuring resistor, a two-phase servo motor having a rotor and a pair of stator windings one of which windings is connected in a series circuit that includes said contacts of said relay and said output terminals of said servo amplifier, an A. C. power source connected to the other winding of said motor, mechanical coupling means between the rotor of said servo motor and said adjustable resistor of said potentiometer measuring circuit, and a mechanical counter driven from the rotor of said servo motor providing a direct reading digital display of the magnitude of said unknown current, the said operating coil of said polarized relay being connected in said input circuit to close said relay contacts only when the direction of current flow through said measuring resistor is opposite to the current flow therethrough produced by said potentiometer measuring circuit.

2. The combination in accordance with claim 1 above including a signal lamp connected across the said output terminals of said servo amplifier.

3. Electrical measuring apparatus for measuring the magnitude of an unknown current comprising the combination of an input circuit including a pair of input terminals for receiving said unknown current, a polarized relay having a pair of normally open contacts and an operating coil therefor one side of which coil is connected to one of said input terminals, and a measuring resistor connected to the other side of said operating coil and to the other input terminal of said input circuit, a potentiometer measuring bridge circuit including an adjustable balancing resistance, a battery, and an adjustable battery-adjust resistance, a standardizing circuit including a standardizing cell one side of which is connected to the junction of said balancing resistance and said battery-adjust resistance, a servo amplifier having a pair of input terminals and a pair of output terminals, conductor means connecting the junction of said relay operating coil and said measuring resistor to the adjustable portion of said balancing resistance, conductor means connecting the junction of said balancing resistance and said battery to one of the input terminals of said amplifier, a S. P. D. T. selector switch, and conductor means connecting the other input terminal of said amplifier to the input terminal side of said measuring resistor in one position of said selector switch and to the other side of said standardizing cell in the other position of said switch, a two-phase servo motor having a rotor and a pair of stator windings one of which windings is connected in a series circuit that includes said contacts of said relay and said output terminals of said servo amplifier, an A. C. power source connected to the other winding of said motor, mechanical coupling means between the rotor of said servo motor and the adjustable portion of said adjustable resistance of said potentiometer measuring bridge circuit, a mechanical counter driven from the rotor of said servo motor providing a direct reading digital display of the magnitude of said unknown current, mechanical coupling means between said servo motor and the adjustable portion of said battery-adjust resistance including a clutch and operating mechanism therefor for engaging and disengaging the motor drive to and from said adjustable portion of said battery-adjust resistance, and a mechanical interconnection between said clutch operating mechanism and said selector switch whereby said selector switch is operated to its standardizing position when said clutch is engaged, the said operating coil of said polarized relay being connected in the said input circuit to close said relay contacts only when the direction of current flow through said measuring resistor is opposite to the current flow therethrough produced by said potentiometer measuring bridge circuit.

4. The combination in accordance with claim 3 above including stabilizing anti-hunt resistance means for said servo motor connected in the input of said servo amplifier.

References Cited in the file of this patent

UNITED STATES PATENTS 2,657,349    Williams ---------------- Oct. 27, 1953